United States Patent
Ward et al.

(10) Patent No.: US 11,919,313 B2
(45) Date of Patent: Mar. 5, 2024

(54) PRINT DEVICE FUNCTIONALITIES

(71) Applicant: Hewlett-Packard Development Company, L.P., Spring, TX (US)

(72) Inventors: Jefferson P. Ward, Vancouver, WA (US); David B. Novak, Corvallis, OR (US); Erik Anderson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 391 days.

(21) Appl. No.: 17/278,808

(22) PCT Filed: Dec. 4, 2018

(86) PCT No.: PCT/US2018/063901
§ 371 (c)(1),
(2) Date: Mar. 23, 2021

(87) PCT Pub. No.: WO2020/117218
PCT Pub. Date: Jun. 11, 2020

(65) Prior Publication Data
US 2022/0032631 A1     Feb. 3, 2022

(51) Int. Cl.
*B41J 2/175* (2006.01)
*G06F 3/12* (2006.01)

(52) U.S. Cl.
CPC ....... *B41J 2/17506* (2013.01); *B41J 2/17546* (2013.01); *G06F 3/1222* (2013.01); *G06F 3/123* (2013.01)

(58) Field of Classification Search
CPC ........... G03G 15/0863; G03G 21/1878; G03G 21/1892; G03G 21/1889; G03G 2215/0697; G03G 2221/1823; B41J 2/17543; B41J 2/17546; B41J 29/393
See application file for complete search history.

(56) References Cited

U.S. PATENT DOCUMENTS

| | | |
|---|---|---|
| 5,021,828 A | 6/1991 | Yamaguchi et al. |
| 5,068,806 A | 11/1991 | Gatten |
| 5,708,912 A | 1/1998 | Lee |
| 5,995,774 A | 11/1999 | Applegate et al. |
| 6,158,837 A | 12/2000 | Hilton et al. |
| 6,584,291 B1 | 6/2003 | Yamamoto |
| 6,955,411 B2 | 10/2005 | Saruta |
| 7,499,657 B2 | 3/2009 | Kim et al. |

(Continued)

*Primary Examiner* — Julian D Huffman
(74) *Attorney, Agent, or Firm* — Brooks, Cameron & Huebsch, PLLC (57) ABSTRACT

A print device may include a refill interface, a processor, and a computer readable medium. The refill interface may have an electrical interface for transmission and reception of signals between the print device and a refill container. And the computer-readable medium may have instructions stored thereon that when executed by the processor are to cause the processor to fetch signals, via the electrical interface of the refill interface, from the refill container indicative of a licensed print functionality of the print device. The instructions may also be to enable the licensed print functionality on the print device responsive to the fetched signals and to maintain the licensed print functionality enabled subsequent to detachment of the refill container.

15 Claims, 4 Drawing Sheets

(56) References Cited

U.S. PATENT DOCUMENTS

| | | | |
|---|---|---|---|
| 8,161,199 B1* | 4/2012 | Weiser | B41J 2/17546 710/72 |
| 2001/0028800 A1 | 10/2001 | Kim | |
| 2003/0142990 A1 | 7/2003 | Weaver | |
| 2003/0202062 A1 | 10/2003 | Steinmetz et al. | |
| 2003/0215246 A1* | 11/2003 | Tabb | G03G 21/1676 399/27 |
| 2004/0125397 A1 | 7/2004 | Adkins et al. | |
| 2004/0169695 A1* | 9/2004 | Forman | B41J 2/17546 347/19 |
| 2005/0151774 A1* | 7/2005 | Silverbrook | B41J 2/17546 347/19 |
| 2005/0157003 A1* | 7/2005 | Silverbrook | B41J 2/14427 347/40 |
| 2005/0157101 A1* | 7/2005 | Silverbrook | B41J 2/17506 347/85 |
| 2005/0168548 A1 | 8/2005 | Phillips | |
| 2005/0243155 A1* | 11/2005 | Silverbrook | B41J 29/393 347/109 |
| 2007/0030539 A1 | 2/2007 | Nath et al. | |
| 2008/0212119 A1 | 9/2008 | Silverbrook et al. | |
| 2009/0109255 A1 | 4/2009 | Rice et al. | |
| 2010/0268591 A1 | 10/2010 | Gnanasambandam et al. | |
| 2012/0092398 A1 | 4/2012 | Puigardeu et al. | |
| 2012/0120139 A1 | 5/2012 | Chiba | |
| 2012/0262749 A1 | 10/2012 | Yamamoto | |
| 2013/0169992 A1 | 7/2013 | Panshin et al. | |
| 2013/0286428 A1 | 10/2013 | Oleinik et al. | |
| 2013/0321535 A1 | 12/2013 | Mauck et al. | |
| 2014/0085658 A1 | 3/2014 | Fallon et al. | |
| 2014/0147154 A1* | 5/2014 | Arai | G03G 15/5066 399/75 |
| 2014/0185084 A1 | 7/2014 | Cudak et al. | |
| 2014/0376931 A1 | 12/2014 | Thacker et al. | |
| 2016/0082740 A1* | 3/2016 | Jeran | G06F 3/0623 358/1.14 |
| 2016/0098234 A1 | 4/2016 | Weaver et al. | |
| 2020/0110559 A1 | 4/2020 | Natori | |
| 2020/0298583 A1 | 9/2020 | Koers | |
| 2021/0370684 A1 | 12/2021 | Devries | |

\* cited by examiner

PRINT DEVICE FUNCTIONALITIES

BACKGROUND

Some print devices may have a number of functionalities. The functionalities may remain static throughout the life of the print device. Said otherwise, by way of example, a print device that is purchased with the ability to print in both duplex and simplex print modes will continue to be able to take advantage of both print functionalities throughout its operational life.

At times, however, it may be possible to alter functionalities available on print devices, such as using firmware (FW) or software (SW) updates, by way of example.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Different print devices may have different functionalities. Further, at times, some print devices may be capable of offering different functionality sets. By way of example, some print devices may have different throughput speeds, may offer simplex and/or duplex printing and scanning, may offer different resolutions, and the like.

There may be a desire, however, to provide altered functionality sets to different print devices. For example, while a print device may be capable of printing at a first higher throughput speed, there may be a desire to offer a version of the print device with a lower throughput speed. For instance, offering a lower throughput speed may be of interest such as to offer devices at different price points, to different customers with different needs, and the like. Indeed, at times it may be considered advantageous to customers to offer the opportunity to license a subset of print functionalities for a lower cost than purchasing a print device with a complete set of print functionalities. However, a number of challenges of a technical nature may impede offering such licensed print functionalities to users.

For example, while in some cases, device functionality may be altered prior to (or at) device purchase, at times such alterations may present challenges. By way of example, one method for altering device functionality (e.g., to enable a licensed print mode) may include establishing a remote connection with a print device. However, if the print device is behind a firewall, this may not be possible. In other cases, even if not behind a firewall, the print device may not be accessible on a network. Furthermore, if technicians are to be used to alter functionality at a device (e.g., applying FW updates), then it may be considered onerous for the technician to travel to the print device, for the device to be unusable while being updated, and/or for the device to be sent to another location, by way of illustration.

Some of the preceding challenges may be experienced across devices of a fleet of deployed print devices, such as in print devices with refillable internal reservoirs. For example, a fleet of print devices used by one customer of a service provider may be varied in both model and capabilities. In such a case, altering functionality across the fleet of print devices may introduce challenges of updating FW and/or SW of the devices using both local and remote mechanisms. For example, the service provider and/or technicians may be called upon to evaluate FW and SW versions and hardware capabilities for each device across the fleet, various updates may be applied, and functionalities may be enable and disabled, as desired, using such techniques. However, such an approach may use relatively significant resources, may cause certain devices to be temporarily unavailable, and/or may cause the customer to replace devices completely, by way of example. As should be apparent, there is a desire for an approach that could be deployed across different device models in different locations, without necessarily taking print devices out of operation.

Continuing with the example of refillable print devices with internal reservoirs, there are a number of functionalities that there may be a desire to enable and/or disable at different times throughout the life of the print devices. For instance, the print devices may have multiple different throughput speeds, may be capable of simplex and duplex print modes, may be able to change resolution, may be able to switch between different color-related print modes (e.g., a draft mode, a professional mode, a depletion mode, a black and white mode, a greyscale mode, etc.), may have the capability to perform finishing operations (e.g., stapling, binding, etc.), and the like. However, some print device functionality may not be used by particular customers. By way of example, for a particular print device, a customer may only use a single throughput speed, duplex mode, and a draft print mode. The customer may be better served, therefore, by not paying for functionalities that will not be employed. There may be a desire, therefore, to be able to license (or not license) certain print functionalities based on user needs.

Additionally, print device manufacturers and service providers may also have an interest in selling print devices without necessarily selling every possible functionality for the print devices. For instance, print device manufacturers and service providers may be interested in selling print device hardware at different price points depending on functionality (e.g., without each possible functionality), such as to potentially increase a number of print devices sold.

While it may be possible to program a print device to support a limited feature set at or before purchase, as noted, this approach may be onerous to customers, manufacturers, and service providers. For instance, users may not be aware of which functionality will be used at the time of purchase and may thus not be in a position to decide which device to purchase based thereon. Manufacturers and service providers may not be able to accurately predict print device functionality demand, thus making decisions as to which devices to manufacture and/or stock (and numbers thereof) challenging.

With the foregoing in mind, one approach for altering functionality of a device may be to use supplies that have signals stored thereon to communicate signals indicative of licensed print functionality. For instance, print devices could connect to the supply and receive or fetch signals from the supply, in which case the signals may indicate information related to the licensed print functionality. Signals received from a supply may indicate whether or not the print device may be able to use a color depletion print mode, use an increased resolution print mode, use a refill pump increased speed mode, etc. For example, the signals may come from a location of the supply assigned to indicate licensed print functionality, the signals may include information indicative of the particular functionality, or the like.

Returning to the example of print devices with a refillable internal reservoir, it may be advantageous that such devices may be refillable using a common refill supply container. For instance, print devices of different capacities, sizes, and functionalities may all be refilled using a common refill supply container. In contrast, more traditional print devices may each have differing supplies formats, interfaces, and sizes, by way of example. Thus, while it may be onerous to program supplies with signals related to functionality to enable on a corresponding print device, it may be significantly less challenging to program a common refill supply container that may be used across different models and types of print devices (e.g., a "common" or "universal" refill supply).

With the foregoing in mind, it may be possible to alter functionality of a print device (e.g., enabling or disabling functionality) in response to signals received from a supply, such as a refill supply container. As such, the selection (and purchase) of a print device (potentially with all or a sub-portion of functionalities enabled or disabled) and enabling of print functionalities (e.g., licensed print functionalities) for the print device may be distinct events (though, in some cases, they may occur in chronological proximity). By way of illustrative example, a licensed print functionality may be enabled on a print device via a website that may facilitate selection of print functionality and acceptance of payment (e.g., payment for access to a licensed print functionality). Subsequently, and in response to the selection of print functionality, a print supply may be connected to the print device and signals may be received by the print device from the print supply in response to which the licensed print functionality may be enabled on the print device. In another illustrative example, a service provider may facilitate enabling of print functionality by attaching print supplies from which signals can be received that are indicative of the desired print functionality. By using signals received from a supply to alter print functionality, it may be possible to enable and disable functionality without exchanging signals with a remote device, such as a remote authentication device. Such a mechanism may also make possible enabling licensed print modes without FW updates, shipping the device to a location for alteration, returning the device in favor of a new device, and the like.

It is noted that supplies have previously been used to store and/or transmit signals between supplies and print devices. For example, such mechanisms have been used previously to encode information regarding amounts of print substance remaining in the supplies, authenticity (or lack thereof) of the print substance, etc. However, in contrast to such cases, claimed subject matter is directed to signals that are indicative of print functionality. As referred to herein, signals indicative of print functionality are signals that indicate to print devices status information of print functionality: that the print functionality is to be enabled on the print device, that the print functionality is to be disabled on the print device, and other information relating to the print functionalities (e.g., whether the enabling of the functionality is to be constrained in time, a number of pages, or other such measures). This is distinguished, then, from signals that encode information as to characteristics of print substances (e.g., a type, an amount remaining, authenticity) or supply containers.

Figure 1:
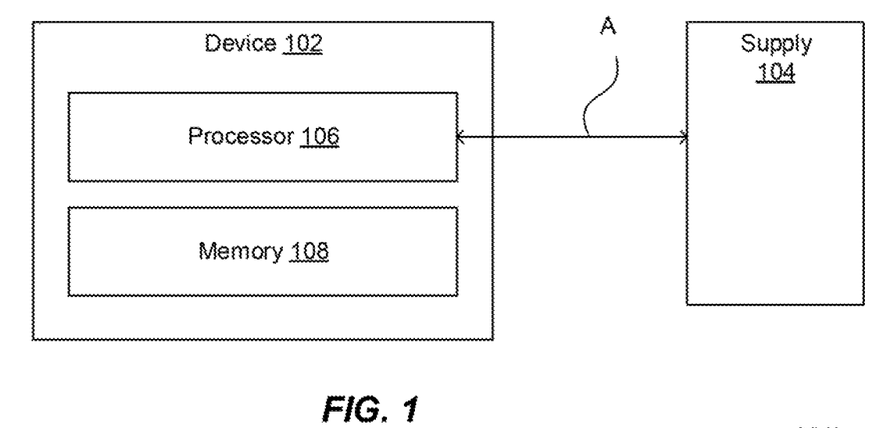
FIG. 1 is a block diagram illustration of an example print system.

One approach for altering functionality of a device is described with reference to FIGS. 1, 2A, and 2B. FIG. 1 is a block diagram illustrating a device 102 and a supply 104 capable of exchanging signals, such as via a communications channel A. As used herein, device 102 refers to, for example, a print device capable of forming markings on a substrate, such as a piece of paper. For instance, device 102 may comprise a device capable of depositing a fluid print substance upon a substrate, such as by using thermal print heads that eject the fluid print substance from nozzles, according to one example. Another example print device 102 may use electrophotography to form markings on a substrate. Of course, other devices, including print devices that use additive processes to form three-dimensional objects on a bed of build material are also contemplated by claimed subject matter.

Device 102 may comprise a processor 106 and a memory 108. As used herein, processor 106 refers to a physical component (e.g., not software per se), which may include a combination of hardware (e.g., circuitry, whether discrete or integrated) and software (e.g., SW and/or FW), capable of executing instructions and/or performing logical operations. Example processors may include general purpose processing units, graphical processing units, application-specific integrated circuits (ASICs), application-specific instruction set processors (ASIPs), field-programmable gate arrays (FPGAs), artificial intelligence (AI) accelerators or microprocessors, and the like.

Memory 108 refers to a machine-readable medium (e.g., not propagating or transitory signals) for storing signals and/or states. Examples of memory 108 may include different forms of non-volatile and volatile memory in which stored signals and/or states may or may not be retained in the absence of power, respectively. Thus, memory 108 may include random access memory (RAM), read-only memory (ROM), erasable programmable ROM (EPROM), electrically erasable programmable ROM (EEPROM), flash memory, phase change memory (PCM), and the like, without limitation. In one case, memory 108 may be capable of storing signals and/or states embodying processor-, machine-, or computer-executable instructions (such as instructions to be discussed hereinafter). For example, stored signals and/or states may be executed by processor 106 in order to receive signals from a supply, such as supply 104, via a communications channel, such as communications channel A, and enable altering of a functionality of device 102 based on the received signals (which may indicate enabling or disabling of that functionality).

It is noted that the following discussion includes reference to flowcharts, computer-readable media, and instructions. Implementation of flowchart methods and computer executable instructions may be performed using mechanisms such as processor 106 and memory 108.

Supply 104 may take a number of possible forms. For example, in an example case in which device 102 comprises a print device, supply 104 may comprise a container of print substance, such as an ink or marking agent, that may be attachable to device 102 for transfer of the print substance to device 102. For example, device 102 may include a reservoir for receiving and storing the print substance. And subsequent to attachment of supply 104 to device 102, the print substance may be transferred to the reservoir.

Example use of a system, such as that illustrated by FIG. 1, to alter functionality of device 102 will now be described making reference to FIGS. 2A and 2B, which are example methods, 200a and 200b, respectively, for altering device functionality. This discussion refers back to elements of FIG. 1 to illustrate potential implementations contemplated by claimed subject matter. It should be apparent that such implementations may thus enable licensed print modes without exchanging signals with remote authentication devices or SW/FW updates by technicians.

In example method 200a, at a first block 202a, signals indicative of functionality are received. By way of example, device 102 may receive signals, such as via a communications channel A, from supply 104. For instance, in one case, an electrical connection may be formed between device 102 and supply 104, and the signals indicative of functionality (e.g., a licensed print functionality) may be transmitted via that electrical connection. In another case, the signals may be transmitted wirelessly, without limitation. The signals may be stored in a particular storage location of supply 104 corresponding to functionality to enable or disable on device 102. The signals may include information (e.g., within a header of a signal packet) indicative of a print functionality. For example, in one case, supply 104 may store signals that when fetched by device 102, allow processor 106 to determine that a licensed print mode (e.g., a color depletion print mode, an increased resolution print mode, a refill pump increased speed mode, or a combination thereof) is to be enabled on device 102.

At block 204a, functionality of the device (e.g., device 102) may be enabled based on the received signals. Thus, by way of example, processor 106 of device 102 may be able to determine that the received signals indicate a licensed functionality (e.g., a color depletion print mode, an increased print resolution print mode, a refill pump increased speed mode, etc.) and may enable functionality based on the received signals. For instance, if the licensed functionality is a color depletion print mode and the signals indicate that device 102 is authorized to enable that color depletion print mode, then processor 106 may enable the color depletion print mode. This may include, for example, altering signals (e.g., storing a flag bit, etc.) as stored in a computer-readable medium (e.g., memory 108) to allow device 102 to take advantage of a print functionality. This information may be communicated, such as to client devices such that client devices wishing to print a document may be presented with the enabled print functionality, such as within a print driver dialog window, by way of non-limiting example.

Figure 2A:
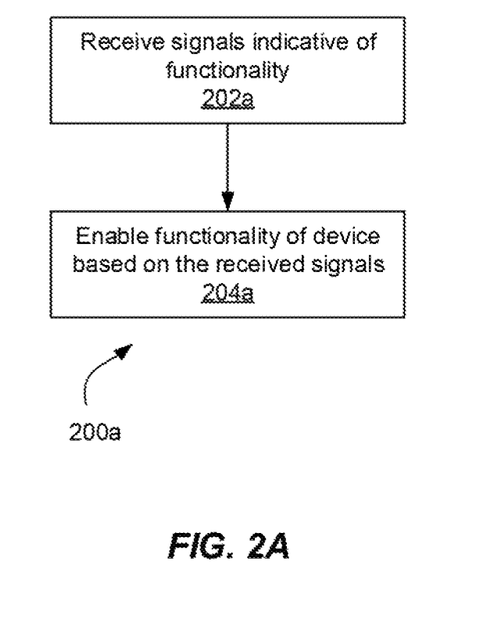
FIGS. 2A and 2B illustrate example methods for enabling functionality on devices.
Figure 2B:
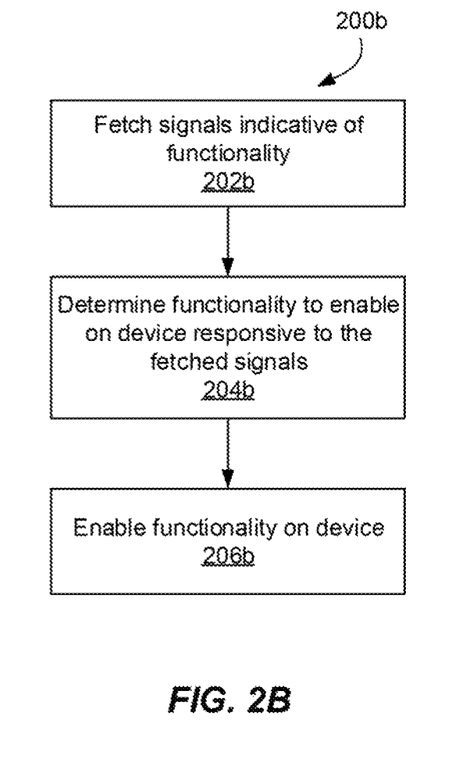

FIG. 2B illustrates a related example method 200b. In method 200b, at block 202b, signals that are indicative of functionality are fetched. For example, in response to execution of instructions stored in memory 108 by processor 106, signals or states may be fetched from supply 104. Fetching of signals may be performed upon detection of a connection between supply 104 and device 102. For example, if supply 104 is a refill container containing a consumable substance, upon attaching of supply 104 to device 102, a query may be made by device 102 as to whether or not signals indicative of print functionality (e.g., licensed print functionality) are stored on supply 104 and, if so, the signals may be fetched.

At times, the functionality related to the signals stored on supply 104 may not be supported by device 102. Thus, as illustrated by block 204b, there may be an interest in determining whether the functionality can be enabled as a preliminary verification. This may be done by determining (e.g., by processor 106) whether the functionality to enable on device 102 is supported. And this determination may be made in response to reception of the fetched signals at block 202b. In one case, this determination may be made by checking the functionality encoded in the fetched signals (or referred to by the fetched signals) against those included on a functionality list stored in memory 108.

By way of example, if the functionality indicated on supply 104 is related to an increased refill pump speed mode, a determination may be made as to whether the mode is supported by device 102. For example, in some cases, only one pump speed may be supported by a print device. In such cases, the functionality may not be enabled on device 102.

Assuming, however, that the print functionality is supported by device 102, then as shown by block 206b, the functionality may be enabled on device 102. Such enabling may be similar to that discussed in relation to block 204a.

In some cases, such as those involving a print device with a refillable internal reservoir, the enabled print functionality is to remain enabled after supply 104 is detached from device 102. As such, the enabling of print functionality may not be constrained to times during which a particular print supply is attached to a print device, but instead, the print device may maintain enablement of the enabled print functionality subsequent to supply removal. Even though the print functionality may remain enabled subsequent to detachment of the supply, there may be a desire to set a constraint on the enabled print functionality. For example, the print functionality may only remain enabled for a set period of time, a set number of pages or impressions, or the like. In some cases, for example, the print functionality may only be enabled, such as part of a promotion to allow customers to decide whether or not the functionality is worth having enabled. Or, for example, service providers may desire to offer functionalities on a limited trial basis, such as to allow customers to try the functionalities within a workflow. A number of possible constraints may be placed on an enabled functionality including those related to a period of time (e.g., a number of days, months, years, etc.) or a number of impressions (e.g., 1 k impressions, etc.).

As noted above, device 102 may be capable of communicating indications of enabled print functionalities external to device 102, such as to client devices (e.g., running print drivers to enable print jobs), remote servers (e.g., enabling remote printing via cloud-based print drivers), service providers, manufacturers, etc. Such communications to external devices may be performed, such as in response to execution of instructions by a processor of a print device. Such communications may include, for example, communication of enabling or disabling of a licensed print mode on a print device to a remote device (e.g., server).

Figure 3:
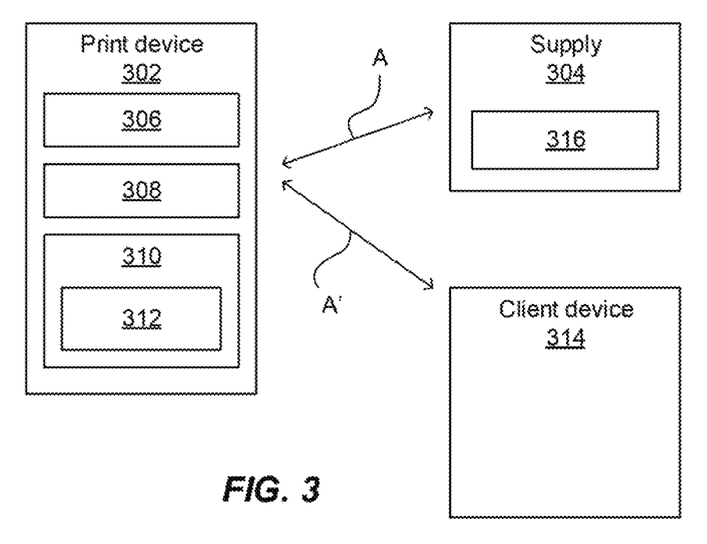
FIG. 3 is a block diagram illustration of an example print system.

Referring to FIG. 3, enabling print functionality on a print device is explained using another example. FIG. 3 includes a print device 302, which may be similar to device 102 described above in relation to FIG. 1. For example, print device 302 is illustrated as including a processor 306 (e.g., similar to processor 106, described above) and a memory 308 (e.g., similar to memory 108, also described above). In addition, print device 302 may include a refill interface 310 and an electrical interface 312. Refill interface 310 may be made up of structural (e.g., mechanical), electrical, and fluidic interface components. In this example, electrical interface 312 is the only of the possible interface components specifically called out, but it is to be understood that other interface components beyond electrical interface 312 may be included, without limitation.

Supply 304 may be similar to supply 104, described above, and may include a computer-readable medium, memory 316, as shown, which may store therein signals and/or states indicative of print functionality. A communications channel A may be established between supply 304 and print device 302, such as via electrical interface 312, in order to exchange signals and/or states between print device 302 and supply 304. In one case, communications channel A may be established by a physical connection between refill interface 312 and a corresponding interface on supply 304. In other cases, however, communications channel A may be established using a wireless connection. Signals may be exchanged between print device 302 and supply 304 indicative of functionality of a print device (e.g., licensed print functionality). In one example, the signals may be indicative of enabling print functionality; in another, the signals may be indicative of disabling print functionality; in yet another, the signals may be to write over signals indicative of print functionality (e.g., writing over signals stored on memory 316 and/or writing over signals stored on memory 308, etc.), without limitation.

FIG. 3 also illustrates a client device 314 having a communications channel A' with print device 302. Communications channel A' may comprise a wired or wireless communications channel, without limitation. In one case, signals indicating enabled print functionality may be transmitted from print device 302 to client device 314 via communications channel A'. In another case, signals indicating enabled print functionality for print device 302 may be transmitted to client device 314 via a different communications channel, such as a communications channel with a remote device (e.g., print server, cloud server, remote authentication device, etc.).

In one implementation, there may be a desire to transmit a print job from client device 314 to be handled by print device 302. In an example in which the print job is to be handled using a color depletion print mode, the print job and indications of print functionality may be transmitted via communications channel A'. Print device 302 may receive signal packets corresponding to the print job and print functionality and may process the print job using the enabled print functionality. If, however, the print functionality is not enabled on print device 302, then another print functionality may be used instead and/or signals may be transmitted to client device 314 indicating that the print functionality is not available.

With the foregoing in mind, in one implementation a print device (e.g., print device 302) may comprise a refill interface (e.g., refill interface 310), a processor (e.g., processor 306), and a computer-readable medium (e.g., a memory 308). The refill interface may comprise an electrical interface (e.g., electrical interface 312) for transmission and reception of signals between the print device and a refill container (e.g., supply 304). Instructions stored on the computer-readable medium, when executed by the processor are to cause the processor to: fetch signals, via the electrical interface of the refill interface, from the refill container indicative of a print functionality of the print device; enable the print functionality on the print device responsive to the fetched signals; and maintain the print functionality enabled subsequent to detachment of the refill container.

Figure 4:
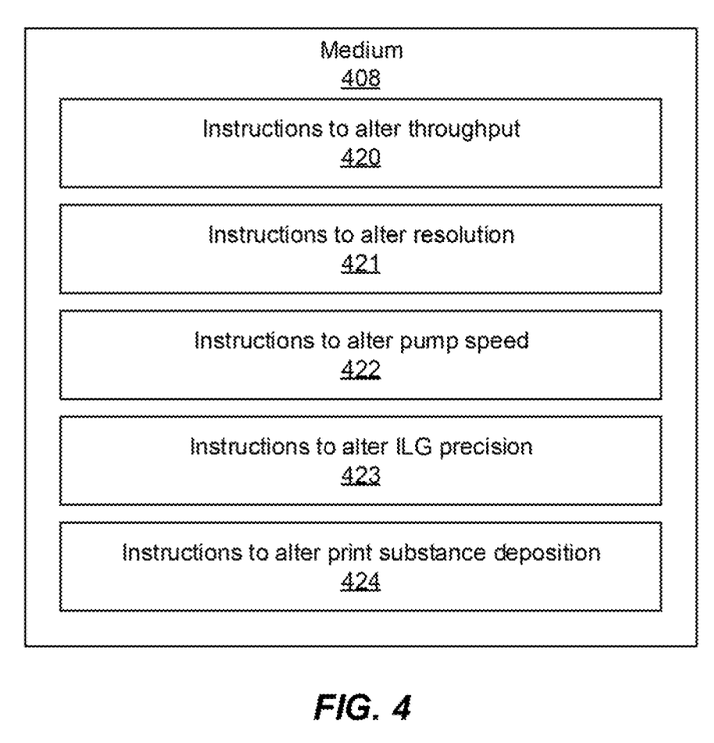
FIG. 4 is an example computer-readable medium having instructions stored thereon.

As described, there may be a desire to enable or disable functionality on a print device, such as enabling or disabling licensed print functionality. FIG. 4 illustrates a computer-readable medium 408, which may be similar to memory 308, memory 316, or memory 108, described above. Medium 408 includes instructions for a variety of different functionalities. For instance, instructions 420 to alter throughput of a print device, may include instructions which, upon enabling by a processor, may increase and/or decrease print throughput. This may include, by way of example, increasing or decreasing a speed at which ink or toner, by way of non-limiting example, may be applied to media, increasing or decreasing a speed at which paper is transported from an input tray to an output tray, and the like.

By way of further example, instructions 421 to alter resolution may, upon execution by a processor, increase or decrease resolution of the print device. For instance, in some cases the print device may ship with a first, or default, resolution, and upon execution (e.g., responsive to reception of signals from a supply) instructions 421, the print device may increase a resolution of the print device. Conversely, there may be a desire to decrease a resolution of the print device. For instance, if a print device is to be used only for draft mode prints, a customer may determine that it is not worth paying for professional print modes and may thus wish to disable the functionality. Instructions 421 may also cause all the print device to disable an enabled functionality and reduce the resolution of the print device.

Instructions 422 to alter pump speed may include instructions that, when executed by a processor, may cause the print device to pump print substance between a print refill container (e.g., supply 304) and an internal reservoir at lower and/or higher speeds. For instance, there may be a desire to pump print substance at a lower speed, such as in order to save money at the expense of time spent pumping, or, vice versa, to pay for an increased pump speed in order to reduce an amount of time spent filling (or emptying in the case of extraction) an internal reservoir. In such cases, responsive to receiving instructions 422, a print device may change a rate at which a pump transfers print substance.

Instructions 423 to alter ink level gauge (ILG) precision may include instructions that, when executed by a processor, change ILG precision. For instance, ILG precision may be of varied importance in different situations. In cases in which large numbers of pages are printed on a print device (and print substance consumed at relatively high rates) there may be a desire to have greater ILG precision such as to ensure that print devices do not run at low print substance levels that may lead to lower print quality. Conversely, cases in which lower numbers of pages are printed on a print device (and print substance consumed at comparatively lower rates) there may be a desire to have lower ILG precision, such as because a likelihood of running at low print substance levels is lower than in the former case. Therefore, upon reception of signals indicative of functionality corresponding to altering ILG precision, a processor may execute instructions 423 in order to enable or disable increased ILG precision. And similar to previous instructions, in some cases there may be a desire to disable functionality that had been enabled previously, and instructions 423 may be capable of such disabling of functionalities.

Instructions 424 to alter print substance deposition may include instructions that, when executed by a processor, change an amount of print substance to be deposited on a medium. For instance, in some cases, there may be a desire to deplete an amount of print substance to be deposited, such as for draft print modes. There may be a desire, for instance, to print using a depleted print mode in order to yield lower-cost prints and copies. In one implementation, the depleted print mode may include a print mode with depleted amounts of color print substance, referred to herein as a color depletion print mode. A print device may not be able to print using the depleted print mode by default, and thus upon reception of signals from a supply indicative of a depleted print mode, a processor may be capable of executing instructions 424 to enable a depleted print mode on the print device. Similarly, in some cases, there may be a desire to disable an altered print substance deposition print mode, such as a color depletion print mode.

It is noted that instructions 420-424 are merely provided by way of example and are not to be taken in a limiting sense. As such, print functionality which may be enabled upon reception of signals from a supply, may include an increase in throughput, an increase in print resolution, an increase in refill pump speed, an increase in ILG precision, a depletion of print substance, or other functionalities that may be enabled on the print device. For instance, other example functionalities that could be enabled or disabled may include: a type of half-toning (e.g., dither matrix or error diffusion), diffusion of the half-toning (e.g., size of the dither matrix, error terms in the error diffusion), color separation in the half-toning (e.g., blue noise color plane dependent matrix, color Tone Dependent color Plane Dependent Fast Error Diffusion (TDPDFED)), half-toning resolution (e.g. 150 dpi duster dither matrix, 1200 dpi error diffusion), mix between half-toning methods (e.g. 0-128=blue noise color plane dependent matrix, 129-255=TDPDFED), without limitation. There may be a desire to alter half-toning parameters, such as to optimize a print device for graphics vs. image printing, to make a print device more tolerant of dot placement errors, and/or to optimize the print device for dot gain on different media types, by way of example. Additionally, the functionality changes could apply to a subset or all print modes (e.g. a plain paper print mode, a photo print mode, a brochure draft print mode, etc.).

Figure 5:
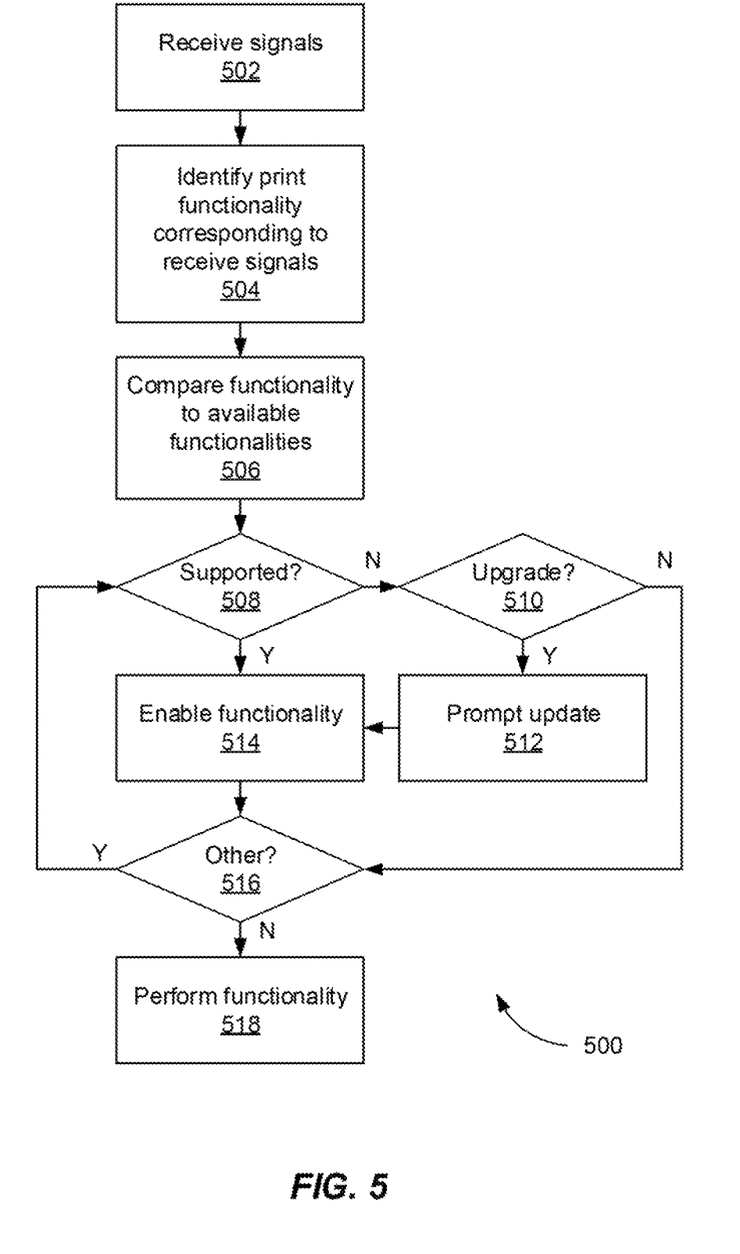
FIG. 5 is a flowchart illustrating an example method of varying functionality of a print device.
Figure 6:
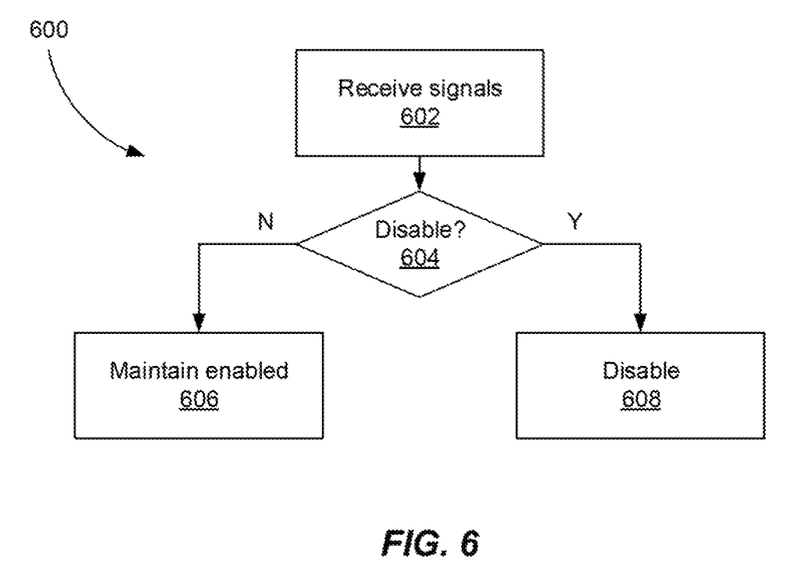
FIG. 6 is a flowchart illustrating an example method of altering print functionality.
Figure 7:
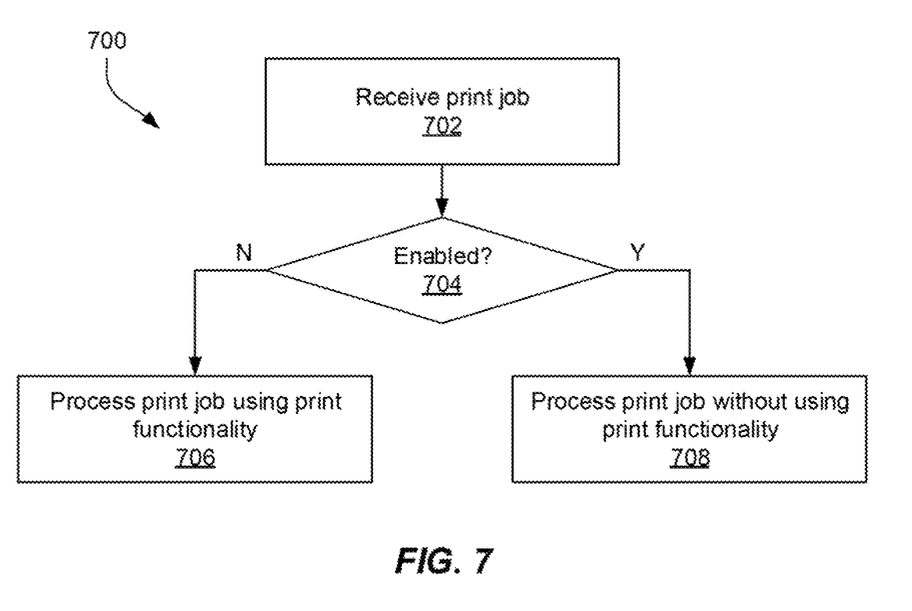
FIG. 7 is a flowchart illustrating an example method of processing a print job.

Several operational examples of the system illustrated in FIG. 3 (and the instructions of FIG. 4) are provided referring to FIGS. 5-7. Commencing with FIG. 5, an example method 500 is illustrated in which functionalities corresponding to fetched or received signals are compared against functionalities supported by a print device. As discussed, above, there may be a desire to confirm support for functionalities prior to attempting to enable the functionalities, such as to improve user experience.

At block 502 of method 500, signals may be received, similar to blocks 202*a* and 202*b* illustrated in FIGS. 2A and 2B. The signals may be indicative of a functionality for a print device. Although not shown in FIG. 5, after reception of signals indicative of print functionalities, signals may be written back to the supply (e.g., supply 304). For example, there may be a desire to write signals back to a computer-readable medium of the supply that cannot be readily erased or altered to indicate that the functionality has been used, and to thus keep subsequent devices from gaining access to the functionality as well.

At block 504, a print functionality is identified corresponding to the signals received at block 502. In some cases, print functionality may be determined based on a location in which the signals are stored (e.g., color depletion print mode in a first location, increased resolution print mode in a second location, increased refill pump speed mode in a third location, etc.) or may be based on information encoded in the signals (e.g., if the functionalities are encoded in a byte of memory, 01010101 might be used to indicate enablement of four functionalities, 00000000 might be used to indicate that the four functionalities are not to be enabled, and 11111111 might be used to indicate that the four functionalities have already been enabled and are not to be enabled using the particular supply, etc.).

Once functionalities have been identified, and as illustrated at block 506, the identified functionalities may be compared against functionalities that are available (e.g., supported) on the print device. For example, some print devices may not be able to support duplex mode, therefore, it may not be possible (absent a hardware change) to enable a duplex print mode responsive to signals received indicative of such a duplex print mode. Similarly, a print device without an internal reservoir may not have a pumping system to empty an external refill container, therefore, it may not be possible (again, absent a hardware change) to enable an accelerated refill pump speed on such a device. Likewise, in some cases print devices may not have FW and/or SW to enable particular functionalities, but such functionalities may be achievable subsequent to installation of new FW and/or SW. For example, a particular FW and/or SW of a print device may not be capable of providing a color depletion print mode. Block 508 illustrates a determination of whether or not the functionalities are supported. If the functionality is not supported, then the decision tree moves to block 510 to determine whether the functionality may be supported after an upgrade. If, at block 508, the functionality is supported, then the decision tree moves to block 514 at which point the functionality may be enabled (e.g., similar to blocks 204*a* in FIG. 2A and 206*b* in FIG. 2B).

Moving on to block 510, in some cases, the print device may be upgradable, such as with a SW update or a hardware add-on. For example, a duplex print mode may be enabled by attaching a duplex add-on to provide a duplex print path, a duplex scan mode may be enabled by attaching a duplexing ADF, a variable refill pump speed mode may be enabled by replacing a standard printbar box with a printbar box having an internal reservoir system with pumps and valves, etc. By way of further example, some functionalities may be enabled by installation of SW updates, such as in response to establishing a communications channel with an update server, or by application of a SW update locally, such as by a service technician. Such updates are illustrated at block 512 and may or may not involve user or technician interactions with a print device. For example, at times there may be a desire for updates to occur automatically (e.g., without human intervention) upon detection of signals to enable unsupported functionalities. In other cases, the updates may occur subsequent to acceptance (e.g., electronic or other) by a user. After updating the print device, method 500 moves to enabling the functionality, at block 514. However, back at block 510, if an upgrade is not possible (or desired), the method may move on to block 516 at which a decision is made as to whether there are other functionalities to be enabled (and for which a determination is to be made as to support by the print device). For example, if there are four functionalities for which support is to be determined, then the loop may run four times for each functionality. Of course, this method is merely provided by way of example and in some cases the determination for support for each of the functionalities may be performed in parallel. Once, at block 516, that no further functionalities are to be checked for support by the print device, method 500 may advance to block 518, which is provided by way of illustration, and indicates performance of the enabled functionality.

Performance of enabled functionality, as illustrated at block 518, may be such as to occur in response to reception of a print job. For instance, a print job to be printed using a color depletion print mode is an example functionality that will be performed in conjunction with a received print job. Other functionalities, however, such as refill pump speed increases, may occur absent reception of a print job. Other such functionalities include, but are not limited to: an improved service routine, an increased precision ILG, low power operation modes, and the like. Thus, example implementations of such subject matter may include determining that signals received from the supply (e.g., block 502) also comprise signals indicative of additional print functionality. In such cases, the method may further comprise causing the print device to perform the additional print functionality absent reception of a print job.

With the foregoing in mind, example implementations of the foregoing may include methods, such as using a print device, of comparing signals indicative of print functionality with print functionality supported by the print device. In such cases, the enabling of the print functionality of the print device may also be based on the comparing of the signals indicative of print functionality with the print functionality supported by the print device, such as consistent with the above description of example method 500.

Similarly, such methods may comprise prompting a FW update, a hardware update, or a combination thereof responsive to a determination that a print functionality corresponding to the signals indicative of print functionality is unsupported by the print device.

Another example implementation of such a method may include execution of instructions by the processor to cause the print device to receive signals indicative of detachment of the supply from the print device. Of course, in some cases, method 500 may be conducted whether or not the supply is still attached to the print device. The print device may receive signals indicative of a print job from a device external to the print device, the print job associated with the print functionality. And the print device may process the print job using the print functionality subsequent to detachment of the supply.

Moving on to FIG. 6, an example method 600 is illustrated going to situations in which the signals received may be indicative of enabling or disabling functionality on a device. For example, and as described above, at times there may be a desire to disable functionality on a device (e.g., if it is determined that the functionality is not being used). In such cases, a supply comprising signals indicative of disabling the functionality may be attached to the print device (or the signals otherwise communicated wirelessly via a communications channel) and the signals may be used by executed instructions to trigger disabling of the functionality on the print device. This is shown in block 602, which indicates the reception of signals, similar to block 502, discussed above. In this case, the signals may include signals to direct the print device to disable certain functionality. For example, at block 604 a determination may be made as to whether the received signals indicate that functionality is to be disabled. By way of illustration, some print devices may be refilled many times during their lifetime, and during each refill, there may be a desire to check to determine whether the supplies includes signals indicative of disabling print functionality that had been previously enabled. If it is determined that the functionality is not to be disabled, then, as shown at block 606, the print device may maintain the functionality in an enabled state. It, however, it is determined that the print functionality is to be disabled, then, as shown at block 608, the functionality may be disabled on the print device. This may include execution of instructions by a processor to alter signals stored at the print device and turn off access to functionality, by way of example.

With the foregoing in mind, then, an example implementation of example method 600 may include disabling enabled print functionality subsequent to reception of additional signals received from an additional supply. For instance, in some cases, this may include execution of instructions (e.g., by a processor of a print device) that cause the print device to receive signals indicative of attachment of an additional supply to the print device. As noted, this may be attachment of a supply at some point during the lifetime of the print device. Signals may be fetched indicative of the enabled print functionality from the additional supply. And the print device may disable the enabled print functionality based on the fetched signals.

It is noted that there may be a desire to track print substance authenticity (e.g., to help ensure print output of desirable quality), and otherwise maintain print functionality enabled even if potentially unauthentic print substance is being used in a print device. For example, this may include determining that a refill container contains an unauthenticated print substance. And maintaining a print functionality enabled subsequent to a determination that the refill container contains the unauthenticated print substance. Nevertheless, messages may be transmitted to the customer or service provider indicating the presence of an unauthenticated print substance, such as to help ensure print output of desirable quality.

Moving on to FIG. 7, an example method 700 is illustrated for determining whether a print functionality associated with a received print job is enabled. For example, there may be a desire to inform users that certain functionality may not be enabled. In some cases, this may include providing instructions for enabling the functionality, or it may include providing a list of fleet devices on which the functionality is enabled and offering to forward the print job to one of those devices.

As shown at block 702, a print job may be received. The print job may include certain characteristics or parameters, including whether the print job is to be processed using color print substances, or black print substances only. Other parameters may include, by way of example but not limitation, whether the print job is to use a color depletion print mode, an increased resolution print mode, an increased speed print mode, and the like. Upon reception of the print job and associated parameters, a determination may be made as to whether the parameters correspond to functionalities of the print job that are enabled (or disabled), as shown at block 704. For example, in one case, the color depletion print mode may not be enabled, and thus there may be a desire to convey to the user a lack of support of the functionality. If it is determined that the print functionality is enabled, then the print device may carry on with processing of the print job using the print functionality, as illustrated at block 708. However, if it is determined that the print functionality is not enabled then it may be desired that the print device nevertheless continue with the print job, but without using the desired print functionality, such as illustrated by block 706. For instance, in a case in which the color depletion print mode is not enabled, the print job may be processed using a draft print mode, by way of illustration.

Thus, in order to provide a method for enabling/disabling functionality of a print device without a connection to a remote device may be accomplished by receiving signals indicative of print functionality from a supply.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A print device comprising:
   a refill interface comprising an electrical interface for transmission and reception of signals;
   a processor; and
   a computer-readable medium with instructions stored thereon that when executed by the processor are to cause the processor to:
   disable a licensed print functionality that remains stored on the print device;
   fetch signals, via the electrical interface of the refill interface, from a refill container indicative of a licensed print functionality of the print device, wherein the licensed print functionality corresponds to at least one function among a plurality of functions executable by the print device;
   enable the licensed print functionality on the print device responsive to the fetched signals, wherein enabling the licensed print functionality includes enabling the at least one function from the plurality of functions; and
   maintain the licensed print functionality enabled subsequent to detachment of the refill container.

2. The print device of claim 1 further comprising instructions that when executed by the processor are to cause the processor to:
   receive, from a client device, signals corresponding to a print job associated with the licensed print functionality; and
   process the print job using the licensed print functionality.

3. The print device of claim 2, wherein the fetched signals also comprise signals indicative of an additional licensed print functionality; and the print device further comprises instructions to cause the print device to perform the additional licensed print functionality absent reception of a print job.

4. The print device of claim 1 further comprising instructions that when executed by the processor are to cause the processor to maintain enablement of the licensed print functionality subsequent to removal of the refill container.

5. The print device of claim 1 further comprising instructions that when executed by the processor are to:
   compare the signals indicative of the licensed print functionality with functionality supported by the print device;
   wherein enablement of the licensed print functionality is to also be based on a comparison of the signals indicative of the licensed print function with the functionality supported by the print device.

6. The print device of claim 5 further comprising instructions that when executed by the processor are to prompt a firmware update, a hardware update, or a combination thereof responsive to a determination that the licensed print functionality is unsupported by the device.

7. The print device of claim 1 further comprising instructions that when executed by the processor are to disable the licensed print functionality subsequent to reception of additional signals received from an additional supply.

8. A method of enabling a licensed print functionality on a print device without exchanging authentication signals with a remote device, the method comprising:
   disabling the licensed print functionality that remains stored on the print device;
   fetching, by a processor of the print device, signals indicative of the licensed print functionality from a supply of the print device, wherein the licensed print functionality corresponds to at least one function among a plurality of functions executable by the print device;
   comparing, by the processor, the licensed print functionality with a plurality of print functionalities supported by the print device; and
   enabling, by the processor, the licensed print functionality responsive to a determination that the licensed print functionality is supported, wherein enabling the licensed print functionality includes enabling the at least one function from the plurality of functions.

9. The method of claim 8 further comprising setting, by the processor, a constraint on the enabled print functionality.

10. The method of claim 9, wherein the setting the constraint comprises setting a time constraint on a duration of time during which the licensed print functionality is to be enabled.

11. A non-transitory computer-readable medium comprising instructions that when executed by a processor of a print device are to cause the print device to:
    disable a licensed print functionality that remains stored on the print device;
    fetch, via an electrical interface of a refill interface of the print device, signals indicative of a licensed print functionality stored on a refill container, wherein the licensed print functionality corresponds to at least one function among a plurality of functions executable by the print device;
    enable the licensed print functionality on the print device responsive to the fetched signals, wherein enabling the licensed print functionality includes enabling the at least one function from the plurality of functions; and
    maintain the licensed print functionality enabled subsequent to detachment of the refill container.

12. The non-transitory computer-readable medium of claim 11 further comprising instructions that when executed by the processor are to cause the print device to:
    receive signals indicative of detachment of the refill container from the print device;
    receive signals indicative of a print job from a device external to the print device, the print job associated with the licensed print functionality; and
    process the print job using the licensed print functionality subsequent to detachment of the refill container.

13. The non-transitory computer-readable medium of claim 12 further comprising instructions that when executed by the processor are to cause the print device to:
    receive signals indicative of attachment of an additional refill container to the print device;
    fetch signals indicative of the enabled licensed print functionality from the additional refill container; and
    disable the licensed print functionality based on the fetched signals.

14. The non-transitory computer-readable medium of claim 11 further comprising instructions that when executed by the processor are to cause the print device to transmit an indication of the enabled print functionality external to the print device.

15. The non-transitory computer-readable medium of claim 11 further comprising instructions that when executed by the processor are to cause the print device to:
   determine that the refill container contains an unauthenticated print substance; and
   maintain enablement of the licensed print functionality subsequent to a determination that the refill container contains the unauthenticated print substance.

* * * * *